United States Patent
Miyamoto et al.

(10) Patent No.: US 11,490,289 B2
(45) Date of Patent: Nov. 1, 2022

(54) CONTROL APPARATUS AND CONTROL METHOD

(71) Applicant: Nippon Telegraph and Telephone Corporation, Tokyo (JP)

(72) Inventors: Kenji Miyamoto, Tokyo (JP); Keita Takahashi, Tokyo (JP); Hirofumi Yamamoto, Tokyo (JP); Noriyuki Ota, Tokyo (JP); Jun Terada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/261,272

(22) PCT Filed: Jul. 19, 2019

(86) PCT No.: PCT/JP2019/028409
§ 371 (c)(1),
(2) Date: Jan. 19, 2021

(87) PCT Pub. No.: WO2020/022203
PCT Pub. Date: Jan. 30, 2020

(65) Prior Publication Data
US 2021/0282052 A1  Sep. 9, 2021

(30) Foreign Application Priority Data
Jul. 23, 2018 (JP) .............................. JP2018-137920

(51) Int. Cl.
*H04W 28/08* (2009.01)
*H04W 40/34* (2009.01)
(Continued)

(52) U.S. Cl.
CPC ......... *H04W 28/0815* (2020.05); *H04L 49/15* (2013.01); *H04W 40/34* (2013.01); *H04W 84/20* (2013.01)

(58) Field of Classification Search
CPC . H04W 28/0815; H04W 40/34; H04W 84/20; H04W 88/085; H04W 72/04;
(Continued)

(56) References Cited

U.S. PATENT DOCUMENTS

| 2014/0031049 A1* | 1/2014 | Sundaresan | ........... H04W 24/02 455/446 |
| 2016/0029205 A1* | 1/2016 | Sirotkin | ................ H04W 16/02 455/418 |

(Continued)

FOREIGN PATENT DOCUMENTS

| WO | WO-2015122198 A1 * | 8/2015 | ............ H04W 24/02 |
| WO | WO 2016/031101 | 3/2016 | |

OTHER PUBLICATIONS

Kiyoshima et al., "LTE-Advanced commercial development utilizing advanced C-RAN architecture-Capacity expansion by add-on cells and realization of stable communication by advanced inter-cell cooperation," NTT DOCOMO Technical Journal, Jul. 2015, 23(2)11-18.

(Continued)

*Primary Examiner* — Mohamed A Kamara
(74) *Attorney, Agent, or Firm* — Fish & Richardson P.C.

(57) ABSTRACT

Provided is a control apparatus that controls any one or all of a plurality of slave station apparatuses communicating with a terminal apparatus, a plurality of master station apparatuses that control the slave station apparatuses, and a transfer apparatus that transfers data transmitted and received between the master station apparatuses and the slave station apparatuses, the control apparatus including an information acquisition unit that acquires information regarding traffic of the data transmitted and received between the master station apparatuses and the slave station apparatuses, and a switching control unit that performs, on the basis of the information regarding the traffic acquired by (Continued)

the information acquisition unit, switching-control of an assignment relationship between the master station apparatus and the slave station apparatus and switching-control of a transfer path of data between the master station apparatus and the slave station apparatus.

6 Claims, 12 Drawing Sheets

(51) Int. Cl.
*H04W 84/20* (2009.01)
*H04L 49/15* (2022.01)

(58) Field of Classification Search
CPC ...... H04W 72/08; H04L 49/15; H04L 47/125; H04L 45/42; H04L 45/44; H04L 45/38; H04L 45/46
See application file for complete search history.

(56) References Cited

U.S. PATENT DOCUMENTS

| 2016/0119932 | A1 | 4/2016 | Cui et al. |
| 2017/0164215 | A1 | 6/2017 | Chen et al. |
| 2018/0139655 | A1* | 5/2018 | Hsu ..................... H04W 24/04 |
| 2019/0174464 | A1* | 6/2019 | Huang ................ H04W 72/048 |

OTHER PUBLICATIONS

Anneal, "5G Radio Access Network Standardization Trend," NTT DOCOMO Technical Journal, Oct. 2017, 25(3):33-43.
Namba et al., "BBU-RRH Switching Schemes for Centralized RAN," IEICE Technical Report, 2013, 112(423):73-78, Abstract.
PCT International Search Report in International Appln. No. PCT/JP2019/028409, dated Sep. 26, 2019, 4 pages.
Camillo et al., "A SDN/NFV based C-RAN architecture for 5G Mobile Networks," 2018 International Conference on Selected Topics in Mobile and Wireless Networking (MOWNET) IEEE, Jun. 20, 2018, 8 pages.

* cited by examiner

CONTROL APPARATUS AND CONTROL METHOD

CROSS-REFERENCE TO RELATED APPLICATIONS

This application is a National Stage application under 35 U.S.C. § 371 of International Application No. PCT/JP2019/028409, having an International Filing Date of Jul. 19, 2019, which claims priority to Japanese Application Serial No. 2018-137920, filed on Jul. 23, 2018. The disclosure of the prior application is considered part of the disclosure of this application, and is incorporated in its entirety into this application.

TECHNICAL FIELD

The present disclosure relates to a control apparatus and a control method.

BACKGROUND ART

In the related art, in a wireless communication system, and particularly in a mobile communication system, a Centralized-Radio Access Network (C-RAN) configuration in which a base station device (base station apparatus) constituted by one device, as disclosed in, for example, Non Patent Literature 1, is divided into two devices, a master station device (master station apparatus) and a slave station device (slave station apparatus), has been examined in order to increase flexibility in installing a base station.

FIG. 11 is a diagram illustrating a configuration of a communication system 1 of C-RAN in the related art. As illustrated in FIG. 11, in the configuration of the communication system 1 of C-RAN in the related art, master station devices 101 (101-1 to 101-3) and slave station devices 201 (201-1 to 201-3) are connected to each other on a one-to-one basis, and the plurality of master station devices 101-1 to 101-3 are aggregated at one location. For example, in FIG. 11, the master station device 101-1 is connected to the slave station device 201-1, the master station device 101-2 is connected to the slave station device 201-2, and the master station device 101-3 is connected to the slave station device 201-3.

However, in C-RAN in the related art in which Physical (PHY) layer functions including a baseband signal processing function are aggregated into the master station device 101 to transmit IQ data of a wireless signal, an increase in the amount of transmission data between the master station device 101 and the slave station device 201 has become a problem.

Consequently, as in Non Patent Literature 2, a technique for reducing the amount of transmission data by redefining the division of functions of a master station device and a slave station device has been examined. Division points in the redefinition of the division of functions include a plurality of candidates. A master station device and a slave station device are constituted by a Packet Data Convergence Protocol (PDCP) layer, a Radio Link Control (RLC) layer, a Media Access Control (MAC) layer, and a PHY layer.

Among the division points, a division point having a function of a PDCP layer in a master station device and having functions of an RLC layer and layers below the RLC layer in a slave station device is referred to as a Higher Layer Split (HLS). In an HLS, the amount of transmission data between a master station device and a slave station device is smaller than that of C-RAN in the related art, and a delay request also becomes less severe.

On the other hand, function division having functions of a MAC layer and layers above the MAC layer or functions of an upper PHY layer and layers above the PHY layer in the master station device, and having the other functions in the slave station device, is referred to as a lower layer split (LLS). In an LLS, the amount of transmission data and a delay request are close to those of C-RAN in the related art, but a high base station association performance can be maintained, which is one of the advantages of C-RAN in the related art.

In either an HLS or an LLS, signal data between a master station device and a slave station device can be transmitted and received by an Ethernet (trade name) frame due to the redefinition of the function division. Thus, it is assumed that a transfer device (transfer apparatus) such as a switch, for example, is installed between the master station device and the slave station device. FIG. 12 is a diagram illustrating a configuration of a communication system 2 in which a transfer device is installed. In the drawing illustrated in FIG. 12, a transfer device 302 is installed between master station devices 102 (102-1 to 102-3) and slave station devices 202 (202-1 to 202-3). The transfer device 302 is a device that transfers data transmitted and received between the master station devices 102 (102-1 to 102-3) and the slave station devices 202 (202-1 to 202-3). The transfer device 302 is, for example, a switch.

It is also assumed that a network is constructed by installing a plurality of transfer devices between the master station devices and the slave station devices. FIG. 13 is a diagram illustrating a configuration of a communication system 3 in which a plurality of transfer devices are installed. In the drawing illustrated in FIG. 13, a plurality of transfer devices 303 (303-1 to 303-4) are installed between master station devices 103 (103-1 to 103-6) and slave station devices 203 (203-1 to 203-6). The transfer devices 303 are devices that transfer data transmitted and received between the master station devices 103 (103-1 to 103-6) and the slave station devices 203 (203-1 to 203-6). The transfer device 303 is, for example, a switch. Also in the cases of FIGS. 12 and 13, the master station devices and the slave station devices are logically connected to each other on a one-to-one basis.

CITATION LIST

Non Patent Literature

Non Patent Literature 1: Kohei Kiyoshima and three others, "LTE-Advanced commercial development utilizing advanced C-RAN architecture—Achievement of stable communication by capacity expansion based on add-on cell and advanced inter-cell association—," NTT DOCOMO Technical Journal Vol. 23, No. 2, pp. 11-18

Non Patent Literature 2: Anil Umesh and four others, "5G radio access network standardization trend," NTT DOCOMO Technical Journal Vol. 25, No. 3, pp. 33-43

SUMMARY OF THE INVENTION

Technical Problem

In a case where master station devices and slave station devices are logically connected to each other on a one-to-one basis, processing resources of the master station devices will be used exclusively even when the amount of traffic to be processed by the slave station devices is small, and thus a large amount of processing resources of the master station devices is wasted. On the other hand, in a case where the amount of traffic of the slave station devices which are to be processed by the master station devices is excessively large, processing resources of the master station devices are insufficient. In this manner, in a case where a network is constructed between the master station devices and the slave station devices, there is a problem in that processing resources of the master station devices cannot be effectively utilized.

In view of the above-described circumstances, an object of the present disclosure is to provide a technique making it possible to effectively utilize processing resources of a master station apparatus in a case where a network having a transfer apparatus disposed between the master station apparatus and a slave station apparatus is constructed.

Means for Solving the Problem

An aspect of the present disclosure is a control apparatus that controls any one or all of a plurality of slave station apparatuses, a plurality of master station apparatuses, and a transfer apparatus, a slave station apparatus of the plurality of slave station apparatuses being assigned to a master station apparatus of the plurality of master station apparatuses, the master station apparatus controlling the slave station apparatus, and the transfer apparatus transferring data transmitted and received between the master station apparatus and the slave station apparatus, the control apparatus including an information acquisition unit that acquires information regarding traffic of the data transmitted and received between the master station apparatus and the slave station apparatus, and a switching control unit that performs, on the basis of the information regarding the traffic acquired by the information acquisition unit, switching-control of an assignment relationship between the master station apparatus and the slave station apparatus and switching-control of a transfer path of data between the master station apparatus and the slave station apparatus.

In the control apparatus according to the aspect of the present disclosure, in a case where traffic of another slave station apparatus of the plurality of slave station apparatuses that is assigned to another master station apparatus of the plurality of master station apparatuses is able to be processed in one master station apparatus of the plurality of master station apparatuses, the switching control unit performs switching-control of an assignment relationship to assign the other slave station apparatus assigned to the other master station apparatus to the one master station apparatus, and performs switching-control of a transfer path of data by instructing the other slave station apparatus to set destinations of data transmitted from the other slave station apparatuses assigned to the other master station apparatus to be a destination of the one master station apparatus.

In the control apparatus according to the aspect of the present disclosure, in a case where traffic of another slave station apparatus of the plurality of slave station apparatuses that is assigned to another master station apparatus of the plurality of master station apparatuses is able to be processed in one master station apparatus of the plurality of master station apparatuses, the switching control unit performs switching-control of an assignment relationship to assign the other slave station apparatus assigned to the other master station apparatus to the one master station apparatus, and performs switching-control of a transfer path of data by instructing the transfer apparatus to set destinations of data transmitted from the other slave station apparatuses assigned to the other master station apparatus to be a destination of the one master station apparatus.

The control apparatus according to the aspect of the present disclosure further includes an information sharing unit that shares, with another control apparatus, information regarding any one or all of the master station apparatus, the slave station apparatus, and the transfer apparatus that are not connected to the control apparatus, in which the switching control unit performs the switching-control of the assignment relationship and the switching-control of the transfer path of data on any one apparatus of the master station apparatus, the slave station apparatus, and the transfer apparatus that are connected to the control apparatus, using the information shared with the other control apparatus by the information sharing unit.

In the control apparatus according to the aspect of the present disclosure, in a case where traffic of a plurality of slave station apparatuses assigned to one master station apparatus of the plurality of master station apparatuses is equal to or greater than a predetermined percentage of processing resources of the one master station apparatus, the switching control unit performs switching-control of an assignment relationship to assign a slave station apparatus which is a target for switching, among the plurality of slave station apparatuses assigned to the one master station apparatus, to another master station apparatus of the plurality of master station apparatuses, and performs switching-control of a transfer path of data by instructing the slave station apparatus which is a target for switching, among the plurality of slave station apparatuses assigned to the one master station apparatus, to set a destination of data transmitted from the slave station apparatus which is a target for switching to be a destination of the other master station apparatus.

In the control apparatus according to the aspect of the present disclosure, in a case where traffic of a plurality of slave station apparatuses assigned to one master station apparatus of the plurality of master station apparatuses is equal to or greater than a predetermined percentage of processing resources of the one master station apparatus, the switching control unit performs switching-control of an assignment relationship to assign a slave station apparatus which is a target for switching, among the plurality of slave station apparatuses assigned to the one master station apparatus, to another master station apparatus of the plurality of master station apparatuses, and performs switching-control of a transfer path of data by instructing the transfer apparatus to set a destination of data transmitted from the slave station apparatus which is a target for switching, among the plurality of slave station apparatuses assigned to the one master station apparatus, to be a destination of the other master station apparatus.

Another aspect of the present disclosure is a control method performed by a control apparatus that controls any one or all of a plurality of slave station apparatuses, a plurality of master station apparatuses, and a transfer apparatus, a slave station apparatus of the plurality of slave station apparatuses being assigned to a master station apparatus of the plurality of master station apparatuses, the master station apparatus controlling the slave station apparatus, the transfer apparatus transferring data transmitted and received between the master station apparatus and the slave station apparatus, the control method including acquiring information regarding traffic of the data transmitted and received between the master station apparatus and the slave station apparatus, and performing, on the basis of the information regarding the traffic acquired in the acquiring of the information, switching-control of an assignment relationship between the master station apparatus and the slave station apparatus and switching-control of a transfer path of data between the master station apparatus and the slave station apparatus.

Effects of the Invention

According to the present disclosure, it is possible to effectively utilize processing resources of master station apparatuses in a case where a network having a transfer apparatus disposed between the master station apparatus and a slave station apparatus is constructed.

DESCRIPTION OF EMBODIMENTS

Embodiments of the present disclosure will be described below with reference to the drawings.

First Embodiment

Figure 1:
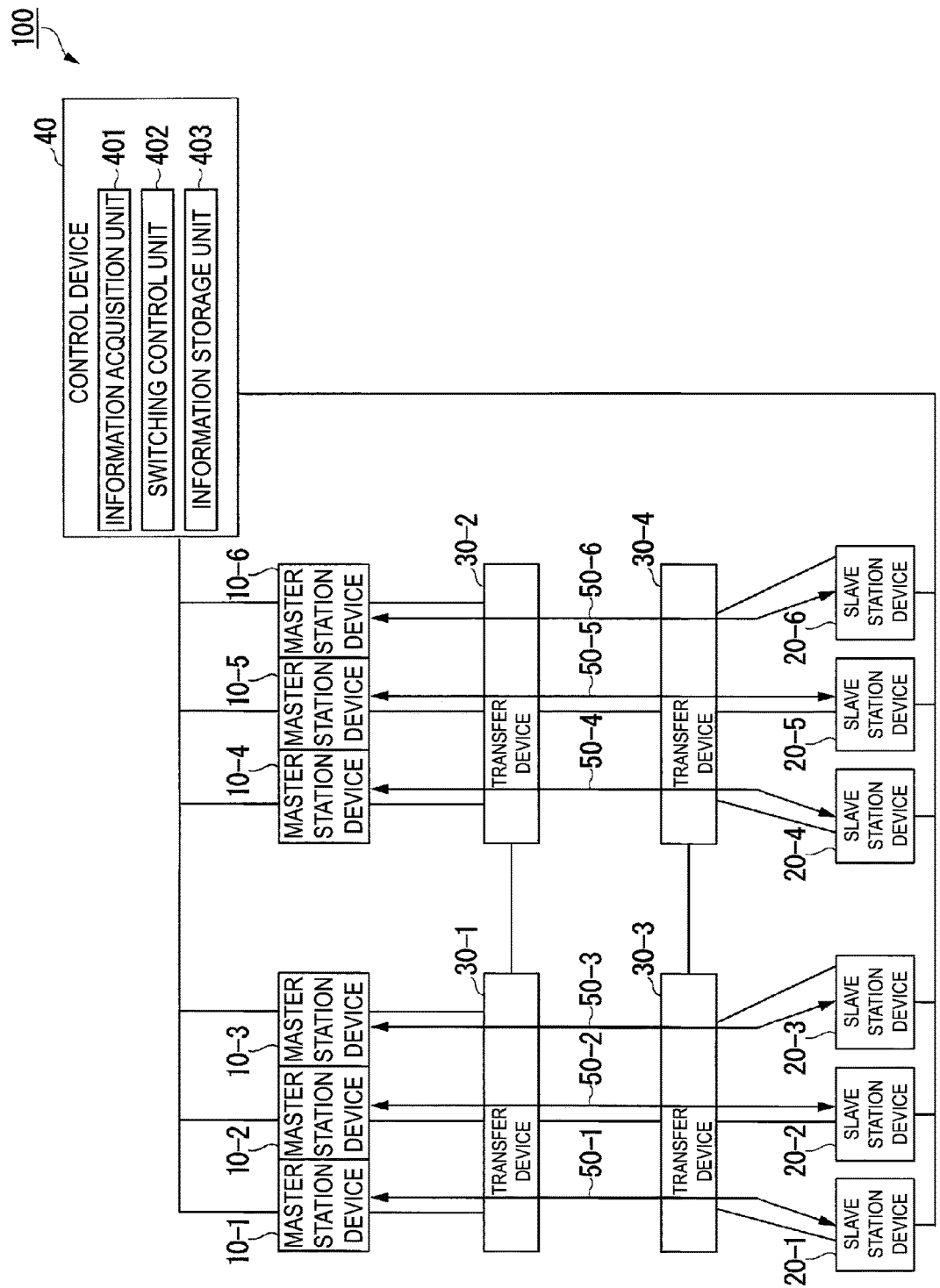
FIG. 1 is a diagram illustrating a configuration of a communication system according to a first embodiment.

FIG. 1 is a diagram illustrating a configuration of a communication system 100 according to a first embodiment. The communication system 100 includes a plurality of master station devices (master station apparatuses) 10 (10-1 to 10-6), a plurality of slave station devices (slave station apparatuses) 20 (20-1 to 20-6), a plurality of transfer devices (transfer apparatuses) 30 (30-1 to 30-4), and a control device (control apparatus) 40.

In FIG. 1, the master station devices 10-1 to 10-3 are connected to the transfer device 30-1. The master station devices 10-4 to 10-6 are connected to the transfer device 30-2. The slave station devices 20-1 to 20-3 are connected to the transfer device 30-3. The slave station devices 20-4 to 20-6 are connected to the transfer device 30-4. In addition, the control device 40 is connected to the master station devices 10-1 to 10-6 and the plurality of slave station devices 20-1 to 20-6.

The transfer device 30-1 is connected to the transfer device 30-2 and the transfer device 30-3 in addition to the master station devices 10-1 to 10-3. The transfer device 30-2 is connected to the transfer device 30-1 and the transfer device 30-4 in addition to the master station devices 10-4 to 10-6. The transfer device 30-3 is connected to the transfer device 30-1 and the transfer device 30-4 in addition to the slave station devices 20-1 to 20-3. The transfer device 30-4 is connected to the transfer device 30-2 and the transfer device 30-3 in addition to the slave station devices 20-4 to 20-6.

In addition, arrows 50-1 to 50-6 illustrated in FIG. 1 indicate transfer paths of data. For example, the arrow 50-1 represents a transfer path of data from the master station device 10-1 to the slave station device 20-1 in a downlink, and a transfer path of data from the slave station device 20-1 to the master station device 10-1 in an uplink.

The master station device 10 controls the slave station device 20 assigned to the master station device 10. The master station devices 10 and the slave station devices 20 are logically connected to each other on a one-to-one basis. For example, the slave station device 20-1 is assigned to the master station device 10-1, the slave station device 20-2 is assigned to the master station device 10-2, the slave station device 20-3 is assigned to the master station device 10-3, the slave station device 20-4 is assigned to the master station device 10-4, the slave station device 20-5 is assigned to the master station device 10-5, and the slave station device 20-6 is assigned to the master station device 10-6.

The master station device 10 stores information regarding the slave station device 20 assigned to the master station device 10. The information regarding the slave station device 20 is information for identifying the slave station device 20 and is, for example, a MAC address of the slave station device 20, or the like. The master station device 10 transmits and receives data to and from the slave station device 20 assigned to the master station device 10 in a case where control is not performed by the control device 40. In a case where control is performed by the control device 40, the master station device 10 changes an assignment relationship and transmits and receives data to and from the slave station device 20 instructed by the control device 40.

The slave station device 20 communicates with a terminal device not illustrated in the drawing. The slave station device 20 transmits and receives data to and from the master station device 10 to which the slave station device 20 is assigned in a case where control is not performed by the control device 40. In a case where control is performed by the control device 40, the slave station device 20 changes an assignment relationship and transmits and receives data to and from the master station device 10 instructed by the control device 40.

The transfer device 30 transfers data transmitted and received between the master station device 10 and the slave station device 20 to a destination included in the data. The transfer device 30 is, for example, a switch.

The control device 40 controls the master station device 10 and the slave station device 20. Specifically, the control device 40 performs switching-control of an assignment relationship between the master station device 10 and the slave station device 20, and switching-control of a transfer path of data between the master station device 10 and the slave station device 20.

Next, a functional configuration of the control device 40 will be described.

The control device 40 includes a central processing unit (CPU), a memory, an auxiliary storage device, and the like connected to each other through a bus and executes a control program. The control device 40 functions as a device including an information acquisition unit 401, a switching control unit 402, and an information storage unit 403 by executing the control program. Note that all or some functions of the control device 40 may be realized using hardware such as an application specific integrated circuit (ASIC), a programmable logic device (PLD), or a field programmable gate array (FPGA). In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The information acquisition unit 401 acquires information regarding traffic by monitoring traffic of data transmitted and received between the master station device 10 and the slave station device 20. The information regarding traffic is, for example, information of the amount of traffic. Specifically, the information acquisition unit 401 acquires the amount of traffic from the master station devices 10-1 to 10-6 to the slave station devices 20-1 to 20-6 in a downlink and the amount of traffic from the slave station devices 20-1 to 20-6 to the master station devices 10-1 to 10-6 in an uplink.

The switching control unit 402 performs switching-control of an assignment relationship between the master station device 10 and the slave station device 20 and switching-control of a transfer path of data between the master station device 10 and the slave station device 20 in response to traffic detected by the information acquisition unit 401.

The information storage unit 403 stores information regarding a device to which the control device 40 is connected (hereinafter referred to as "connection device information"). For example, the information storage unit 403 stores processing resources of the master station device 10 and information of the slave station device 20 assigned to the master station device 10, for each master station device 10. In addition, for example, the information storage unit 403 stores information of the master station device 10 to which the slave station device 20 is assigned for each slave station device 20. The information storage unit 403 is constituted using a storage device such as a magnetic hard disk device or a semiconductor storage device.

Figure 2:
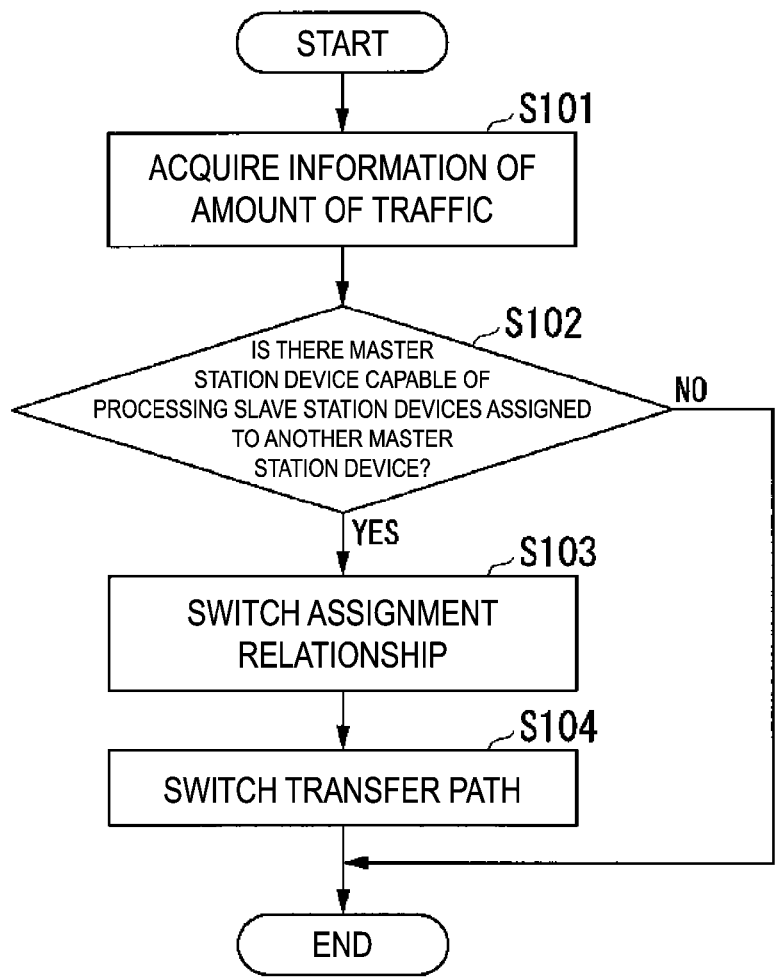
FIG. 2 is a flowchart illustrating a flow of processing of a control device according to the first embodiment.

FIG. 2 is a flowchart illustrating a flow of processing of the control device 40 according to the first embodiment.

The information acquisition unit 401 acquires the amount of traffic of each of the master station devices 10 by monitoring traffic of data transmitted and received between the master station device 10 and the slave station device 20 (step S101). For example, the information acquisition unit 401 may monitor traffic output from the master station device 10 to acquire the amount of traffic of each of the master station devices 10, or may monitor traffic input from the master station device 10 to acquire the amount of traffic of each of the master station devices 10. The information acquisition unit 401 outputs information of the acquired amount of traffic to the switching control unit 402.

The switching control unit 402 determines whether there is a master station device 10 capable of processing the slave station device 20 assigned to another master station device 10 on the basis of the information of the amount of traffic which is output from the information acquisition unit 401 and the connection device information stored in the information storage unit 403 (step S102). Specifically, the switching control unit 402 adds the amount of traffic of the slave station device 20 assigned to a certain master station device 10 and the amount of traffic of at least one slave station device 20 among the plurality of slave station devices 20 assigned to other master station devices 10, and determines that there is a master station device 10 capable of processing the slave station device 20 assigned to another master station device 10 in a case where the sum does not exceed processing resources of the master station device 10.

For example, the switching control unit 402 adds the amount of traffic of the slave station device 20-1 assigned to the master station device 10-1 and the amount of traffic of the slave station device 20-2 assigned to the other master station device 10-2, and determines that there is a master station device 10 capable of processing the slave station device 20-2 assigned to the other master station device 10-2 in a case where the sum does not exceed processing resources of the master station device 10-1.

On the other hand, in a case where the sum exceeds the processing resources of the master station device 10, it is determined that there is no master station device 10 capable of processing the slave station device 20 assigned to another master station device 10.

In a case where there is no master station device 10 capable of processing the slave station device 20 assigned to another master station device 10 (step 102—NO), the control device 40 terminates the processing of FIG. 2.

On the other hand, in a case where there is a master station device 10 capable of processing the slave station device 20 assigned to another master station device 10 (step 102—YES), the switching control unit 402 performs switching-control of an assignment relationship (step S103). Specifically, the switching control unit 402 instructs the master station device 10 and the slave station device 20 which are targets for switching of an assignment relationship to switch the assignment relationship.

For example, in a case where the amount of traffic flowing to the slave station devices 20-1 to 20-3 is small and capable of being processed by the master station device 10-1, the switching control unit 402 gives an instruction for switching an assignment relationship so that all of the slave station devices 20-1 to 20-3 are assigned to the master station device 10-1. In addition, the switching control unit 402 instructs the master station devices 10-1 to 10-3 to switch an assignment relationship so that all of the slave station devices 20-1 to 20-3 are assigned to the master station device 10-1. Thereby, the master station devices 10-1 to 10-3 and the slave station devices 20-1 to 20-3 change their own setting. In this case, the master station device 10-2 cancels an assignment relationship with the slave station device 20-2, and the master station device 10-3 cancels an assignment relationship with the slave station device 20-3. The slave station devices 20-1 to 20-3 change the setting of the slave station devices 20-1 to 20-3 to be assigned to the master station device 10-1. The master station device 10-1 changes the setting of the master station device 10-1 to assign the slave station devices 20-1 to 20-3 to the master station device 10-1.

Thereafter, the switching control unit 402 performs switching-control of a transfer path (step S104).

Specifically, the switching control unit 402 performs switching-control of a transfer path so that data is transmitted and received to and from the device after an assignment relationship is changed. For example, in the above-described example, the switching control unit 402 switches a transfer path so that data is transmitted and received between the master station device 10-1 and the slave station devices 20-1 to 20-3.

The switching control unit 402 performs switching-control of a transfer path by transmitting, to the master station device 10 and the slave station device 20, an instruction for changing a destination address of a frame to be transmitted in the master station device 10 and the slave station device 20. For example, the switching control unit 402 transmits an instruction for setting a destination address of data to be the master station device 10-1 for the slave station devices 20-1 to 20-3 and transmits an instruction for setting a destination address of data to be the slave station devices 20-1 to 20-3 for the master station device 10-1. Thereby, the slave station devices 20-1 to 20-3 set a destination address of data to be the master station device 10-1. In addition, the master station device 10-1 sets a destination address of data to be any one of the slave station devices 20-1 to 20-3.

Figure 3:
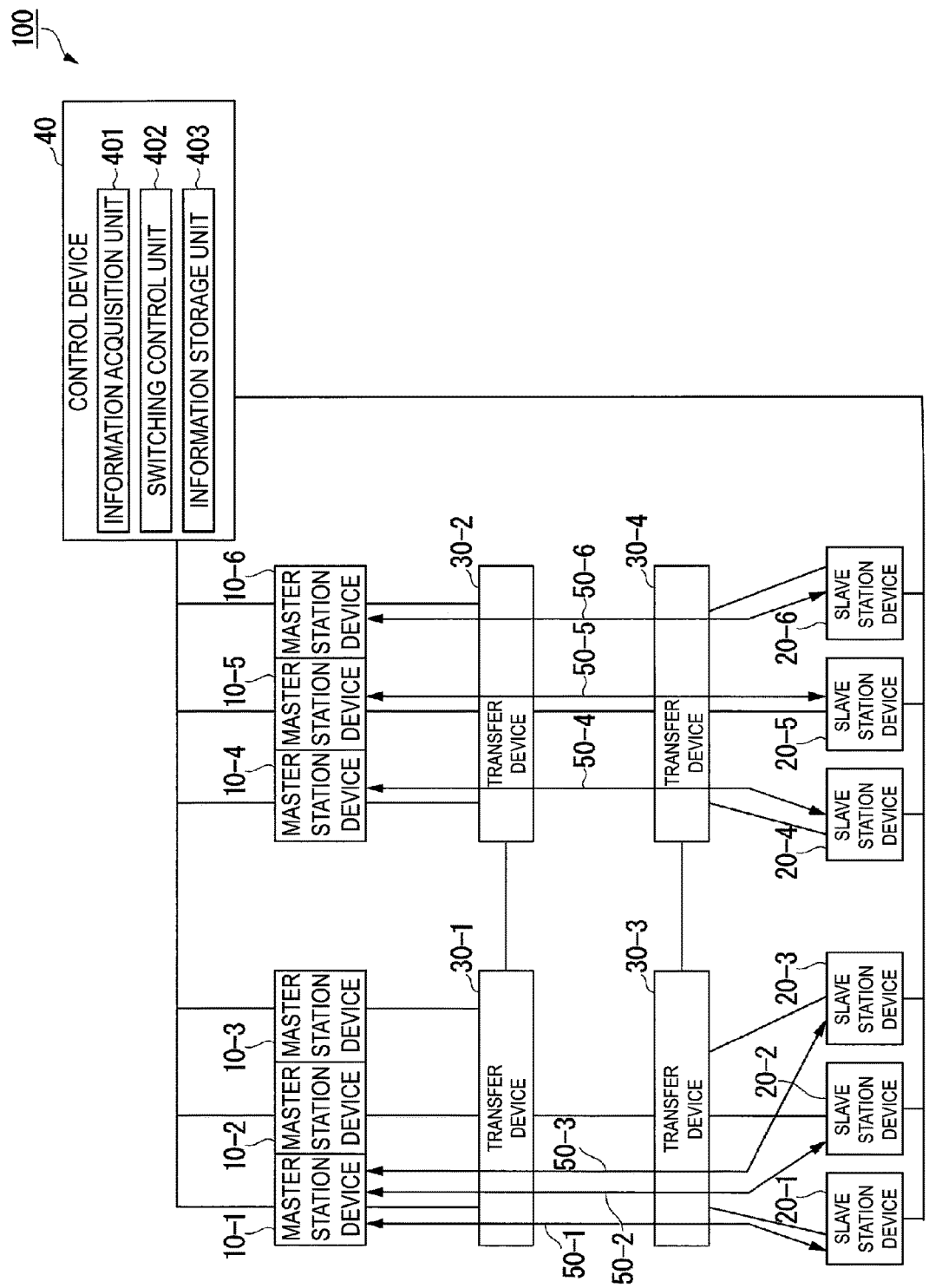
FIG. 3 is a diagram illustrating a configuration of the communication system after switching control according to the first embodiment.

FIG. 3 is a diagram illustrating a configuration of the communication system 100 after switching control according to the first embodiment.

As illustrated in FIG. 3, after the switching control is performed, a transfer path is switched such that data is transmitted and received between the master station device 10-1 and the slave station devices 20-1 to 20-3, and control is performed such that data is not transmitted and received to and from the master station devices 10-2 and 10-3. Thereby, the master station devices 10-2 and 10-3 do not need to operate, and processing resources are freed up.

The control device 40 configured as described above performs switching-control of an assignment relationship between the master station device 10 and the slave station device 20 in accordance with traffic of data transmitted and received between the master station device 10 and the slave station device 20. In the switching-control, when traffic of the slave station devices 20 assigned to other master station devices 10 can be processed by one master station device 10, the slave station devices are assigned to the master station device 10 capable of processing traffic of the slave station devices 20 assigned to other master station devices 10. In addition, the control device 40 performs switching-control of a transfer path of data between the master station device 10 and the slave station device 20 after switching-control of an assignment relationship is performed. Thereby, processing resources of the master station device 10, of which assignment to the slave station device 20 has been cancelled, are freed up, and the master station device 10 to which the slave station device 20 assigned to another master station device 10 is newly assigned can utilize the processing resources. For this reason, in a case where a network is constructed between the master station device 10 and the slave station device 20, processing resources of the master station device 10 can be effectively utilized.

In addition, the master station device 10, of which assignment to the slave station device 20 has been cancelled, does not need to operate.

For this reason, power consumption can also be reduced.

Modification Example

An object to be monitored by the information acquisition unit 401 may be a quality of service (QoS) value of traffic, rather than the amount of traffic.

Second Embodiment

Figure 4:
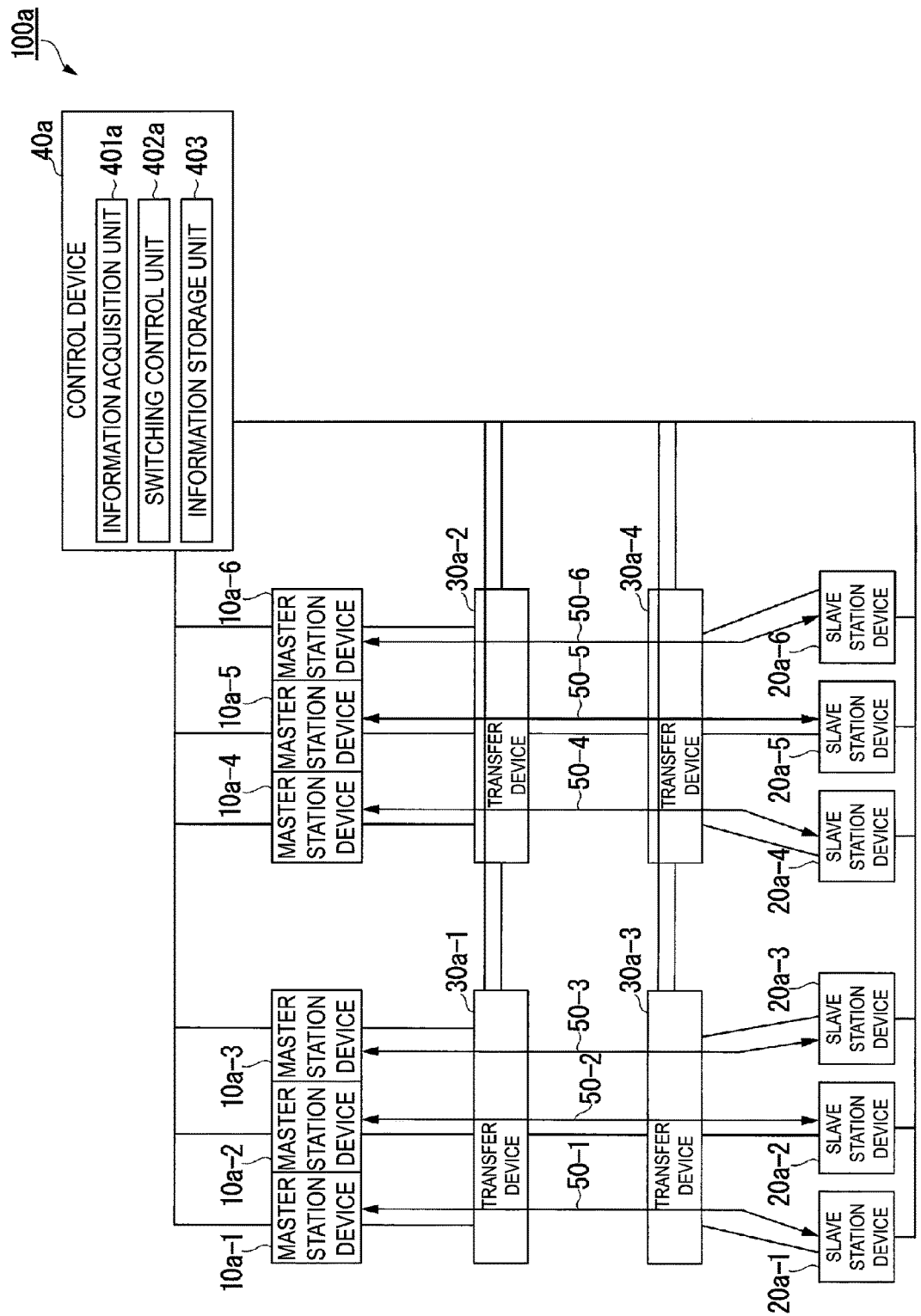
FIG. 4 is a diagram illustrating a configuration of a communication system according to a second embodiment.

FIG. 4 is a diagram illustrating a configuration of a communication system 100a according to a second embodiment. The communication system 100a includes a plurality of master station devices 10a (10a-1 to 10a-6), a plurality of slave station devices 20a (20a-1 to 20a-6), a plurality of transfer devices 30a (30a-1 to 30a-4), and a control device 40a. In the second embodiment, the control device 40a is connected to the master station devices 10a-1 to 10a-6, the slave station devices 20a-1 to 20a-6, and the transfer devices 30a-1 to 30a-4.

The master station device 10a stores information regarding the slave station device 20a belonging to the master station device 10a.

The master station device 10a transmits and receives data to and from the slave station device 20a which is assigned to the master station device 10a in a case where control is not performed by the control device 40a. The master station device 10a changes an assignment relationship in a case where control is performed by the control device 40a.

The slave station device 20a communicates with a terminal device not illustrated in the drawing. The slave station device 20a transmits and receives data to and from the master station device 10a to which the slave station device 20a is assigned in a case where control is not performed by the control device 40a. In a case where control is performed by the control device 40a, the slave station device 20a changes an assignment relationship.

In a case where control is not performed by the control device 40a, the transfer device 30a transfers data transmitted and received between the master station device 10a and the slave station device 20a to a destination included in the data. In a case where control is performed by the control device 40a, the transfer device 30a transfers data transmitted and received between the master station device 10a and the slave station device 20a to a destination instructed by the control device 40a.

In addition, the transfer device 30a monitors traffic of data transmitted and received between the master station device 10a and the slave station device 20a. For example, the transfer device 30a-1 monitors traffic of the master station devices 10a-1 to 10a-3, the transfer device 30a-2 monitors traffic of the master station devices 10a-4 to 10a-6, the transfer device 30a-3 monitors traffic of the slave station devices 20a-1 to 20a-3, and the transfer device 30a-4 monitors traffic of the slave station devices 20a-4 to 20a-6. The transfer device 30a transmits information of the amount of traffic acquired by monitoring to the control device 40a. The information of the amount of traffic includes information for identifying the master station device 10a or the slave station device 20a and the amount of traffic. The transfer device 30a is, for example, a switch.

Next, a specific configuration of the control device 40a will be described.

The control device 40a includes a CPU, a memory, an auxiliary storage device, and the like which are connected to each other by a bus, and executes a control program. The control device 40a functions as a device including an information acquisition unit 401a, a switching control unit 402a, and an information storage unit 403 by executing the control program. Note that all or some functions of the control device 40a may be realized using hardware such as an ASIC, a PLD, or an FPGA. In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The control device 40a differs in configuration from the control device 40 in that the information acquisition unit 401a and the switching control unit 402a are provided instead of the information acquisition unit 401 and the switching control unit 402. The control device 40a is the same as the control device 40 for the other configurations. Thus, the information acquisition unit 401a and the switching control unit 402a will be described.

The information acquisition unit 401a acquires traffic of data transmitted and received between the master station device 10a and the slave station device 20a from the transfer device 30a.

The switching control unit 402a performs the same process as that of the switching control unit 402. A difference between processing performed by the switching control unit 402a and processing performed by the switching control unit 402 is switching-control of a transfer path. Specifically, the switching control unit 402a performs switching-control of a transfer path on the transfer device 30a so that data is transmitted and received to and from a device after an assignment relationship is changed.

Referring to FIG. 3 as an example, that is, in a case where a transfer path is switched so that data is transmitted and received between the master station device 10a-1 and the slave station devices 20a-1 to 20a-3, the switching control unit 402a transmits an instruction for changing all destinations of data of the slave station devices 20a-1 to 20a-3 received by the transfer device 30a-3 for an uplink signal to the master station device 10a-1 to the transfer device 30a-3. In addition, an instruction for changing destinations of data of the master station device 10a-1 received by the transfer device 30a-1 for a downlink signal to any one of the slave station devices 20a-1 to 20a-3 is transmitted to the transfer device 30a-1.

The control device 40a configured as described above can obtain the same effects as those in the first embodiment.

In addition, the control device 40a performs switching-control of a transfer path of data on the transfer device 30a that transfers data between the master station device 10a and the slave station device 20a instead of performing the switching-control on the master station device 10a and the slave station device 20a. Thereby, even in a case where the number of master station devices 10a and the number of slave station devices 20a, which are targets for switching-control of a transfer path of data, have increased, it is not necessary to perform control on all of the master station devices 10a and the slave station devices 20a which are targets for switching-control of a transfer path of data. For this reason, it is possible to reduce a processing load of the control device 40a.

Modification Example

The control device 40a may acquire information of the amount of traffic by the information acquisition unit 401a similar to the first embodiment, rather than acquiring the information from the transfer device 30a.

An object to be monitored by the transfer device 30a may be a QoS value of traffic rather than the amount of traffic.

Third Embodiment

Figure 5:
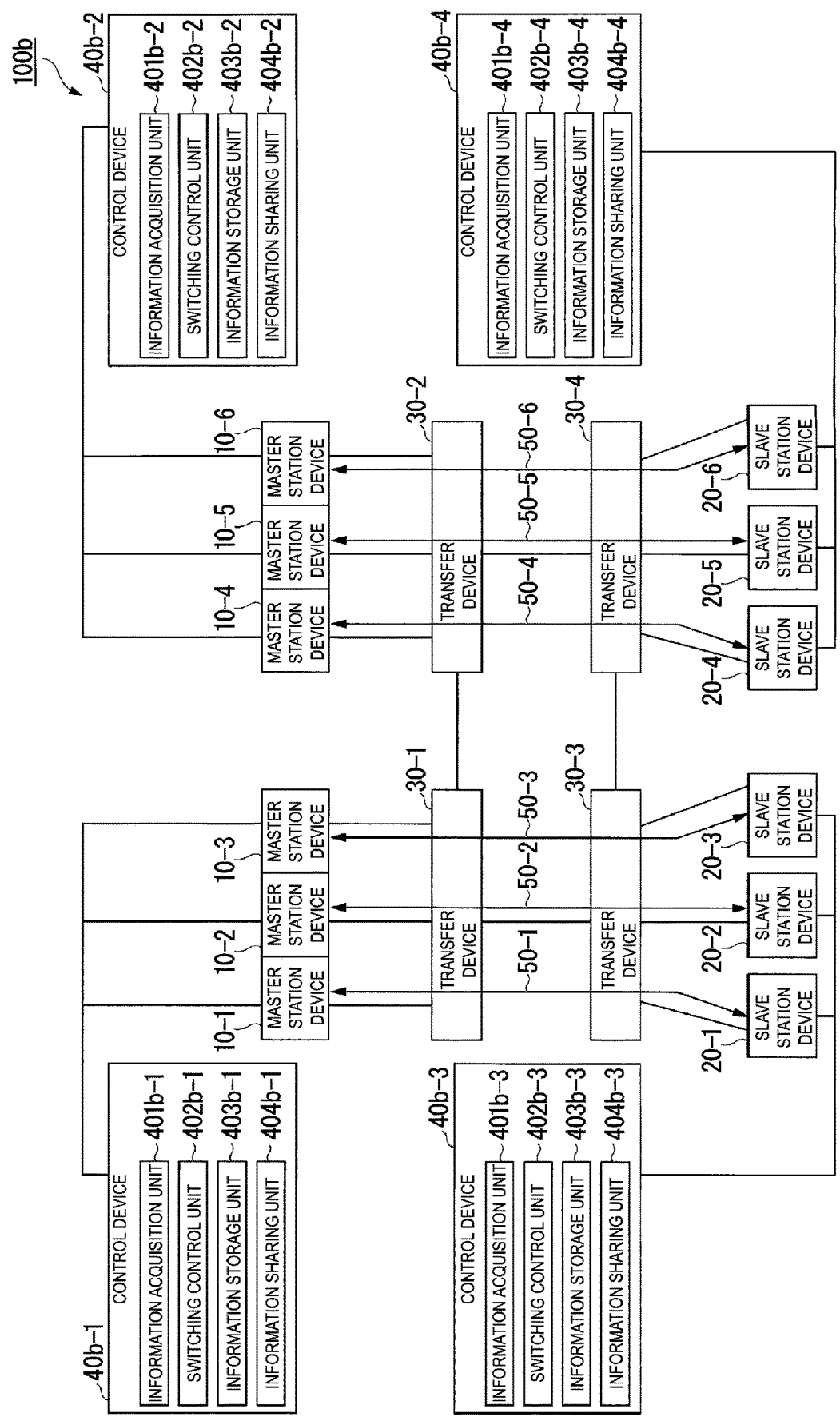
FIG. 5 is a diagram illustrating a configuration of a communication system according to a third embodiment.

FIG. 5 is a diagram illustrating a configuration of a communication system 100b according to a third embodiment. The communication system 100b includes a plurality of master station devices 10 (10-1 to 10-6), a plurality of slave station devices 20 (20-1 to 20-6), a plurality of transfer devices 30 (30-1 to 30-4), and a plurality of control devices 40b (40b-1 to 40b-4). In the third embodiment, the control device 40b is connected to the master station devices 10-1 to 10-6 and the slave station devices 20-1 to 20-6.

More specifically, the control device 40b-1 is connected to the master station devices 10-1 to 10-3, the control device 40b-2 is connected to the master station devices 10-4 to 10-6, the control device 40b-3 is connected to the slave station devices 20-1 to 20-3, and the control device 40b-4 is connected to the slave station devices 20-4 to 20-6. In this manner, in the third embodiment, the control devices 40b are disposed to be distributed in plural (for example, four), and the plurality of control devices 40b share information included in each of the plurality of control devices 40b to control the master station devices 10 and the slave station devices 20.

Next, a functional configuration of the control device 40b will be described. Note that the control devices 40b-1 to 40b-4 have the same configuration except that their connecting devices are different. For this reason, description will be given by collectively referring to the control devices 40b-1 to 40b-4 as the control device 40b.

The control device 40b includes a CPU, a memory, an auxiliary storage device, and the like which are connected to each other by a bus, and executes a control program. The control device 40b functions as a device including an information acquisition unit 401b, a switching control unit 402b, an information storage unit 403b, and an information sharing unit 404b by executing the control program. Note that all or some functions of the control device 40a may be realized using hardware such as an ASIC, a PLD, or an FPGA. In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The information acquisition unit 401b acquires information regarding traffic by monitoring traffic of data transmitted and received between the master station device 10 and the slave station device 20. Specifically, the information acquisition unit 401b acquires the amount of traffic from the master station devices 10 to the slave station devices 20 in a downlink and the amount of traffic from the slave station devices 20 to the master station devices 10 in an uplink.

The switching control unit 402b performs switching-control of an assignment relationship of either the master station device 10 or the slave station device 20 and switching-control of a transfer path of data between the master station device 10 and the slave station device 20, in accordance with traffic detected by the information acquisition unit 401b. Specifically, in a case where the control device 40b is connected to the master station device 10 and is not connected to the slave station device 20, the switching control unit 402b performs switching-control of an assignment relationship and switching-control of a transfer path of data on the master station device 10. Furthermore, in a case where the control device 40*b* is connected to the slave station device 20 and is not connected to the master station device 10, the switching control unit 402*b* performs switching-control of an assignment relationship and switching-control of a transfer path of data on the slave station device 20.

The information storage unit 403*b* stores connection device information. Information regarding a device (for example, the master station devices 10-1 to 10-3) to which a certain control device 40*b* (for example, the control device 40*b*-1) is connected and information regarding a device (for example, a device other than the master station devices 10-1 to 10-3) to which another control device 40*b* (for example, the control device 40*b* other than the control device 40*b*-1) acquired by the information sharing unit 404*b* is connected are stored in the information storage unit 403*b* as the connection device information.

The information sharing unit 404*b* shares information with other control devices 40*b*. For example, the information sharing unit 404*b* transmits the connection device information stored in the information storage unit 403*b* of the control devices 40*b* to the other control devices 40*b*, and shares information by receiving the connection device information from the other control devices 40*b*. The information sharing unit 404*b* stores the received connection device information in the information storage unit 403*b*. Note that a timing at which the information sharing unit 404*b* shares information may be a preset timing or may be a timing at which information of the amount of traffic is acquired.

The control device 40*b* performs switching-control of an assignment relationship and switching-control of a transfer path of data as follows.

Specifically, the switching control unit 402*b*-1 performs switching-control of an assignment relationship and switching-control of a transfer path of data on the master station devices 10-1 to 10-3.

In addition, the switching control unit 402*b*-2 performs switching-control of an assignment relationship and switching-control of a transfer path of data on the master station devices 10-4 to 10-6.

In addition, the switching control unit 402*b*-3 performs switching-control of an assignment relationship and switching-control of a transfer path of data on the slave station devices 20-1 to 20-3.

Further, the switching control unit 402*b*-4 performs switching-control of an assignment relationship and switching-control of a transfer path of data on the slave station devices 20-41 to 20-6.

A method of performing switching-control of an assignment relationship and switching-control of a transfer path of data is the same as that in the first embodiment, and thus description thereof will be omitted.

In the first embodiment, switching-control of an assignment relationship and switching-control of a transfer path of data are performed on all of the master station devices 10 and the slave station devices 20 by one control device 40. On the other hand, each of the plurality of control devices 40*b* configured as described above performs switching-control of an assignment relationship and switching-control of a transfer path of data only on a device to which the control devices 40*b* is connected. Thereby, it is possible to reduce a processing load generated in one control device 40*b*.

In addition, similarly to the first embodiment, in a case where a network is constructed between the master station device 10 and the slave station device 20, processing resources of the master station device 10 can be effectively utilized.

Modification Example

An object to be monitored by the information acquisition unit 401*b* may be a QoS value of traffic rather than the amount of traffic.

Rather than sharing information between the plurality of control devices 40*b*-1 to 40*b*-4, a high-level control device connected to the plurality of control devices 40*b*-1 to 40*b*-4 may be configured to acquire all pieces of information and transmit an instruction for control to each of the control devices 40*b*-1 to 40*b*-4 on the basis of the acquired information.

Figure 6:
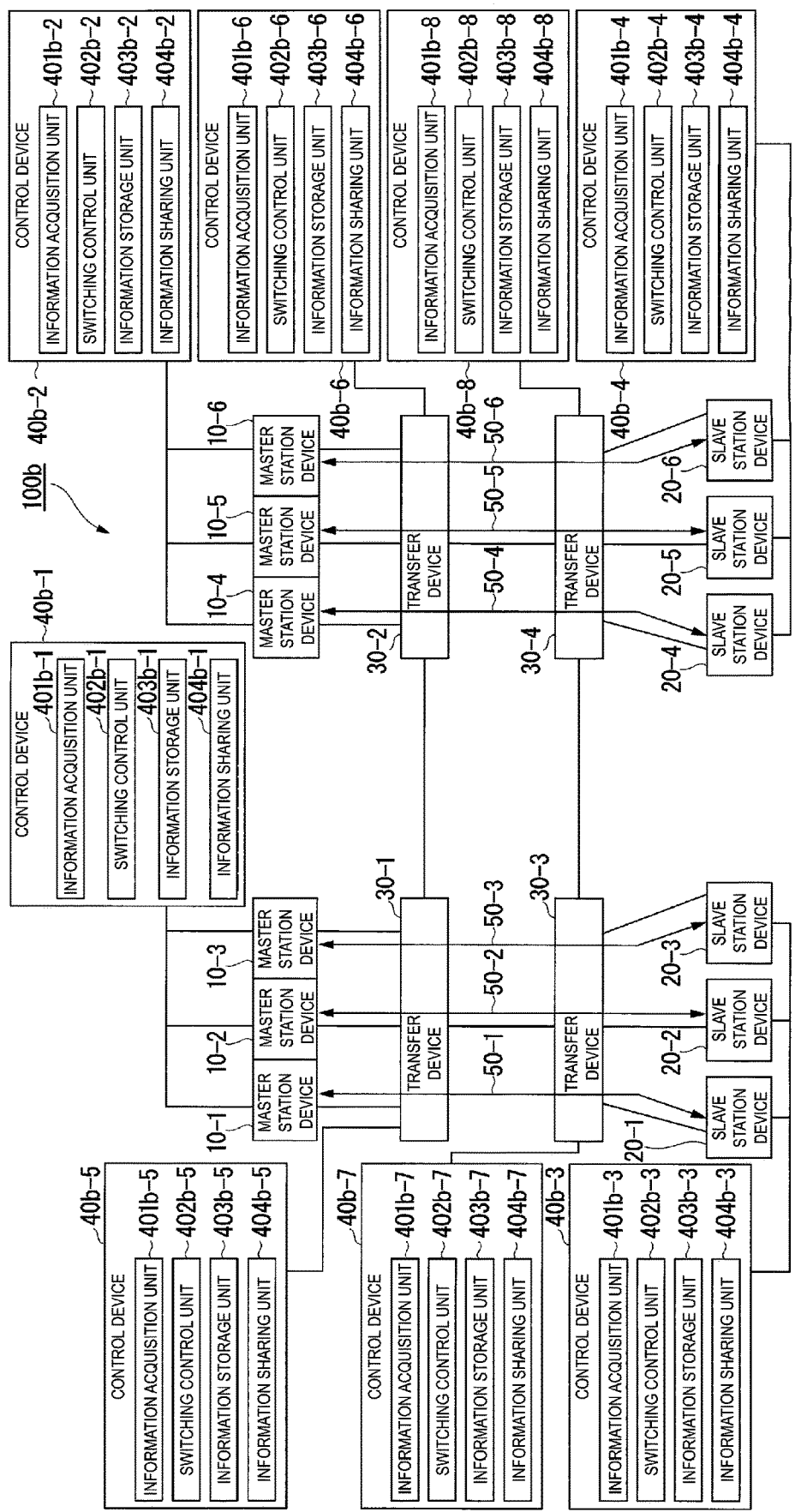
FIG. 6 is a diagram illustrating another configuration of the communication system according to the third embodiment.

In the communication system 100*b* of the third embodiment, the control device 40*b* may be configured to be also connected to the transfer device 30 as in the second embodiment. FIG. 6 is a diagram illustrating another configuration of the communication system 100*b* according to the third embodiment. The communication system 100*b* illustrated in FIG. 6 includes a plurality of master station devices 10 (10-1 to 10-6), a plurality of slave station devices 20 (20-1 to 20-6), a plurality of transfer devices 30 (30-1 to 30-4), and a plurality of control devices 40*b* (40*b*-1 to 40*b*-8). In the drawing illustrated in FIG. 6, the control device 40*b* is connected to the master station devices 10-1 to 10-6, the slave station devices 20-1 to 20-6, and the transfer device 30.

More specifically, in the drawing illustrated in FIG. 6, in addition to the communication system 100*b* in FIG. 5, the control device 40*b*-5 is connected to the transfer device 30-1, the control device 40*b*-6 is connected to the transfer device 30-2, the control device 40*b*-7 is connected to the transfer device 30-3, and the control device 40*b*-8 is connected to the transfer device 30-4. In this manner, in another example of the third embodiment, the control devices 40*b* are disposed to be distributed in plural (for example, eight), and the plurality of control devices 40*b* share information included in each of the plurality of control devices 40*b* to control the master station devices 10, the slave station devices 20, and the transfer devices 30.

As specific processing, the third embodiment differs from the second embodiment in that the control devices 40*b*-5 to 40*b*-8 are individually installed for the respective transfer devices 30-1 to 30-4, and the control devices 40*b*-5 to 40*b*-8 perform control only on the transfer devices 30-1 to 30-4 to which each of the control devices 40*b*-5 to 40*b*-8 is connected. Specific control processing is the same as that in the second embodiment, and thus description thereof will be omitted.

Fourth Embodiment

Figure 7:
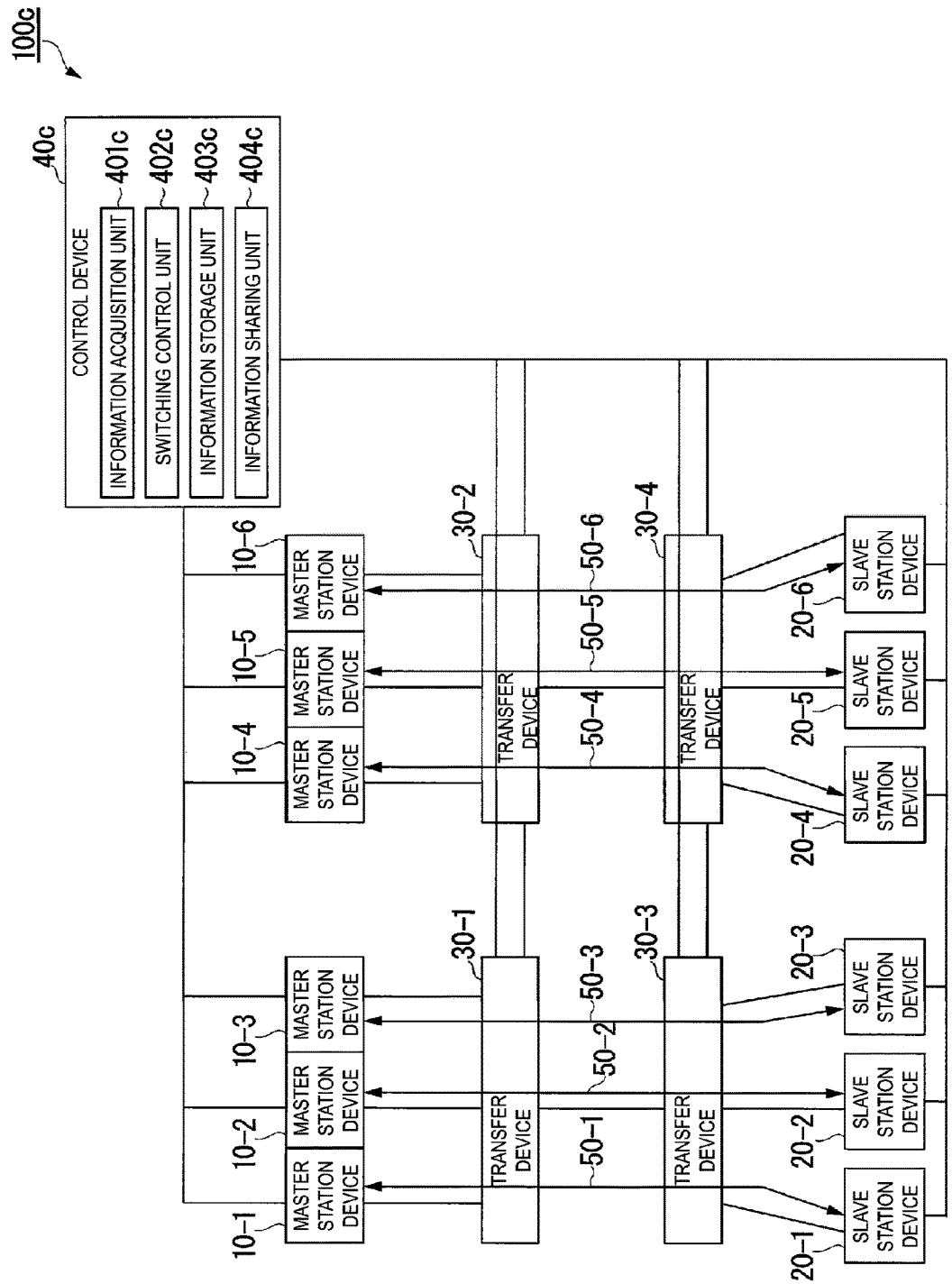
FIG. 7 is a diagram illustrating a configuration of a communication system according to a fourth embodiment.

FIG. 7 is a diagram illustrating a configuration of a communication system 100*c* according to a fourth embodiment. The communication system 100*c* includes a plurality of master station devices 10 (10-1 to 10-6), a plurality of slave station devices 20 (20-1 to 20-6), a plurality of transfer devices 30 (30-1 to 30-4), and a control device 40*c*. In the fourth embodiment, the control device 40*c* is connected to all of the master station devices 10-1 to 10-6, the slave station devices 20-1 to 20-6, and the transfer devices 30-1 to 30-4.

The control device 40*c* executes switching-control of an assignment relationship and switching-control of a transfer path of data in the first to third embodiments in combination.

For example, the control device 40c may monitor the amount of traffic as in the first embodiment, transmit an instruction for performing switching-control of a transfer path of data to the transfer device 30 as in the second embodiment, acquire information of the amount of traffic from the transfer device 30 as in the second embodiment, and transmit an instruction for performing switching-control of a transfer path of data to the master station device 10 and the slave station device 20 as in the first embodiment. Note that, in this case, the control device 40c may be configured to be distributed in plural and share information as in the third embodiment, instead of as one device as illustrated in FIG. 7.

Next, a functional configuration of the control device 40c will be described.

The control device 40c includes a CPU, a memory, an auxiliary storage device, and the like which are connected to each other by a bus, and executes a control program. The control device 40c functions as a device including an information acquisition unit 401c, a switching control unit 402c, an information storage unit 403c, and an information sharing unit 404c by executing the control program. Note that all or some functions of the control device 40c may be realized using hardware such as an ASIC, a PLD, or an FPGA. In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The information acquisition unit 401c performs the same processes as those of the information acquisition units 401, 401a, and 401b in the first to third embodiments. Note that whether to perform the same processing as that of any one of the information acquisition units 401, 401a, and 401b is appropriately set.

The switching control unit 402c performs the same processes as those of the switching control units 402, 402a, and 402b in the first to third embodiments. Note that whether to perform the same processing as that of any one of the switching control units 402, 402a, and 402b is appropriately set.

The information storage unit 403c stores connection device information.

The information sharing unit 404c performs the same processing as that of the information sharing unit 404b.

The control device 40c configured as described above can obtain the same effect as in the first to third embodiments.

In addition, the control device 40c can perform a plurality of controls for switching-control of an assignment relationship and switching-control of a transfer path of data. Thereby, the control device 40c can perform more suitable control depending on the situation. For this reason, it is possible to improve convenience.

Modification Example

The communication system 100c according to the fourth embodiment may be modified in the same manner as in the first to third embodiments.

Fifth Embodiment

Figure 8:
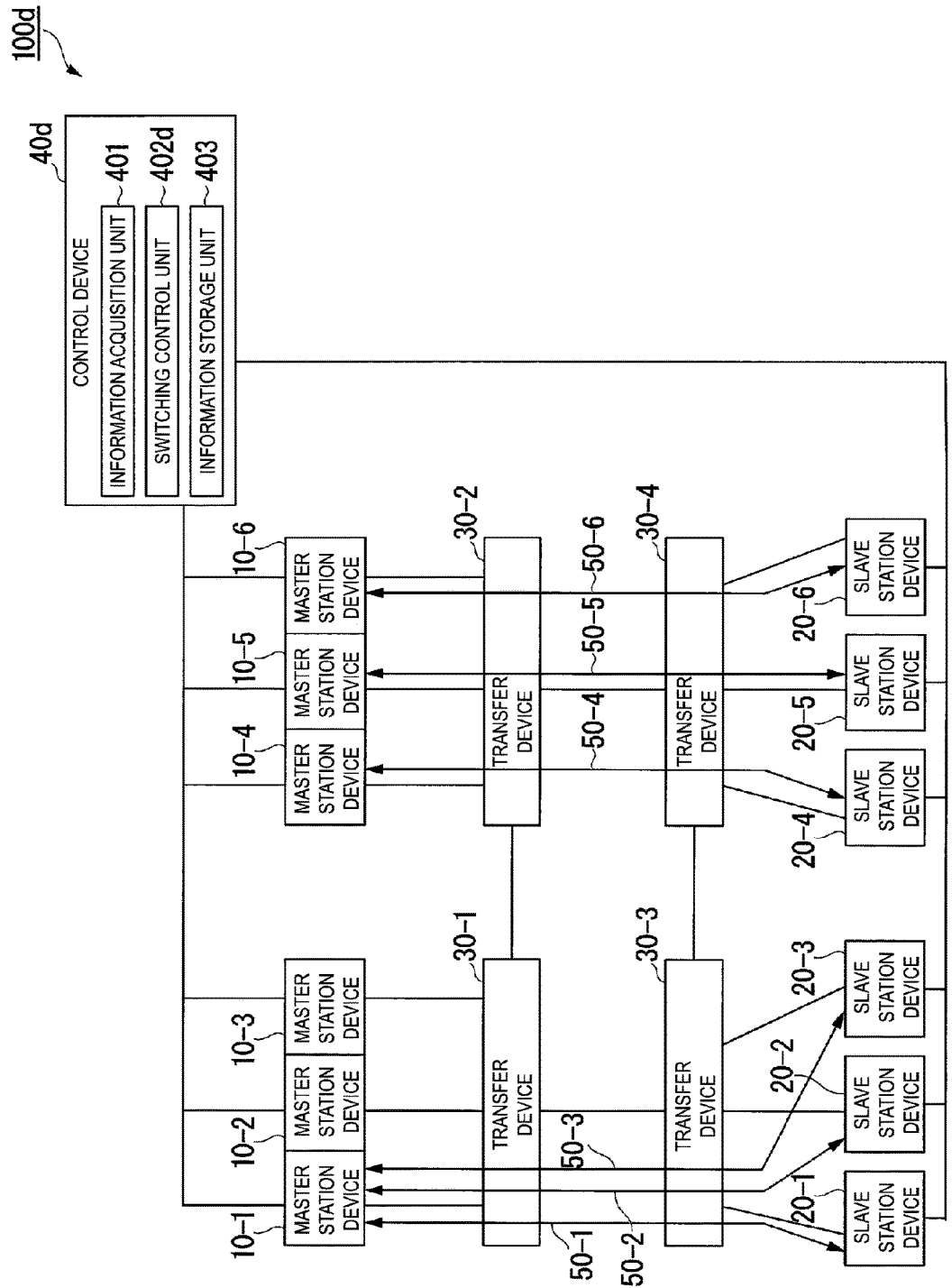
FIG. 8 is a diagram illustrating a configuration of a communication system according to a fifth embodiment.

FIG. 8 is a diagram illustrating a configuration of a communication system 100d according to a fifth embodiment. The communication system 100d includes a plurality of master station devices 10 (10-1 and 10-4 to 10-6), a plurality of slave station devices 20 (20-1 to 20-6), a plurality of transfer devices 30 (30-1 to 30-4), and a control device 40d. In the fifth embodiment, the control device 40d is connected to the master station devices 10-1 to 10-6 and the slave station devices 20-1 to 20-6.

Further, in the fifth embodiment, three slave station devices 20-1 to 20-3 are assigned to the master station device 10-1, and the slave station devices 20 are not assigned to the master station devices 10-2 and 10-3. That is, the fifth embodiment is an embodiment corresponding to a case where the plurality of slave station devices 20 are assigned to one master station device 10 through the processing of any one of the first to fourth embodiments or a case where the plurality of slave station devices 20 are assigned to one master station device 10 before the processing of the first to fourth embodiments is performed.

Next, a functional configuration of the control device 40d will be described.

The control device 40d includes a CPU, a memory, an auxiliary storage device, and the like connected to each other through a bus and executes a control program. The control device 40d functions as a device including an information acquisition unit 401, a switching control unit 402d, and an information storage unit 403 by executing the control program. Note that all or some functions of the control device 40d may be realized using hardware such as an ASIC, a PLD, or an FPGA. In addition, the control program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. In addition, the control program may be transmitted and received through an electrical communication line.

The control device 40d differs in configuration from the control devices 40, 40a, 40b, and 40c according to the other embodiments in that the control device 40d includes the switching control unit 402d. The control device 40d is the same as the control devices 40, 40a, 40b, and 40c for the other configurations. For this reason, the switching control unit 402d will be described.

The switching control unit 402d performs the same processing as the switching control unit 402. A difference between processing performed by the switching control unit 402d and processing performed by the switching control unit 402 is switching-control of an assignment relationship.

Specifically, the switching control unit 402d performs switching-control of an assignment relationship on the master station device 10 and the slave station device 20 so as to make the plurality of slave station devices 20 assigned to one master station device 10 be assigned to other master station devices 10.

Figure 9:
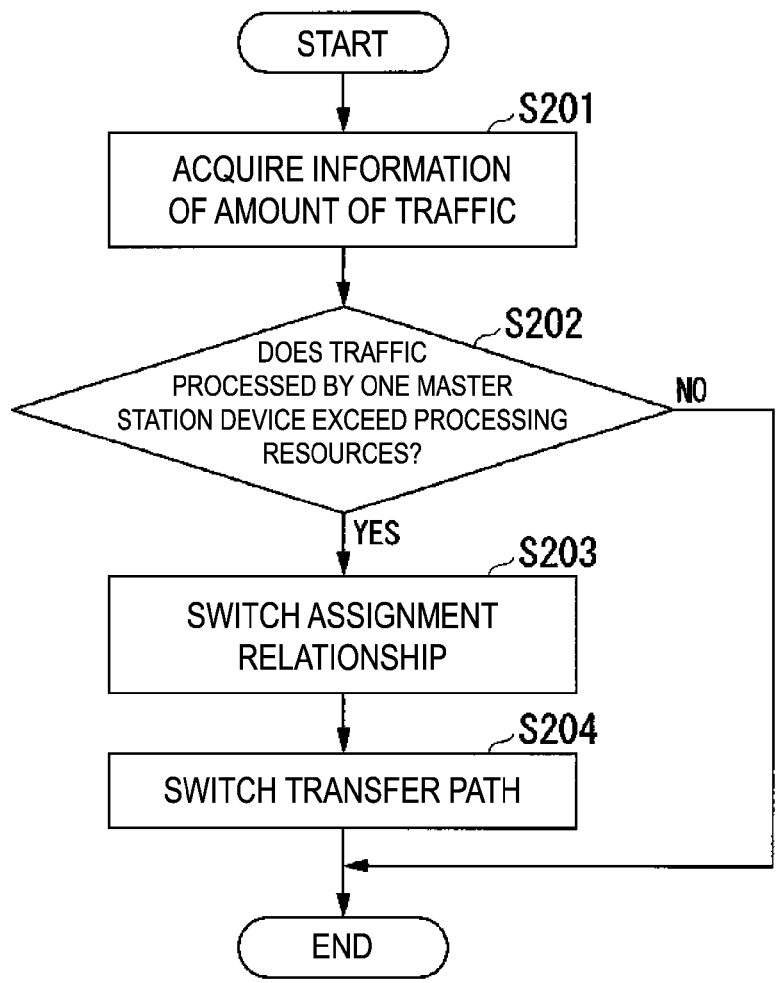
FIG. 9 is a flowchart illustrating a flow of processing of a control device according to the fifth embodiment.

FIG. 9 is a flowchart illustrating a flow of processing of the control device 40d according to the fifth embodiment.

The information acquisition unit 401 acquires the amount of traffic of the master station devices 10 by monitoring traffic of data transmitted and received between the master station devices 10 and the slave station devices 20 (step S201). The information acquisition unit 401 outputs the information of the acquired amount of traffic to the switching control unit 402.

The switching control unit 402d determines whether or not traffic to be processed by one master station device 10 exceeds processing resources of one master station device 10 on the basis of the information of the amount of traffic output from the information acquisition unit 401 and connection device information stored in the information storage unit 403 (step S202). Specifically, the switching control unit 402d first acquires processing resources of a certain master station device 10 (for example, the master station device 10-1) with reference to the connection device information. Next, the switching control unit 402d compares the acquired processing resources with the sum of the amounts of traffic of the slave station devices 20 (for example, the slave station devices 20-1 to 20-3) belonging to a certain master station device 10 (for example, the master station device 10-1).

Then, in a case where the sum of the amounts of traffic exceeds the processing resources, the switching control unit 402d determines that traffic to be processed by one master station device 10 exceeds processing resources of one master station device 10.

On the other hand, in a case where the sum of the amounts of traffic does not exceed the processing resources, the switching control unit 402d determines that traffic to be processed by one master station device 10 does not exceed the processing resources of one master station device 10.

In a case where traffic to be processed by one master station device 10 does not exceed processing resources of one master station device 10 (step 202—NO), the control device 40d terminates the processing of FIG. 9.

On the other hand, in a case where traffic to be processed by one master station device 10 exceeds processing resources of one master station device 10 (step 202—YES), the switching control unit 402d performs switching-control of an assignment relationship (step S203). Specifically, the switching control unit 402d instructs the master station device 10 and the slave station device 20 for which switching of an assignment relationship is to be performed to switch an assignment relationship.

For example, the switching control unit 402d instructs the master station device 10-1 to perform switching for cancelling the assignment of the slave station devices 20-2 and 20-3 to the master station device 10-1, instructs the slave station devices 20-2 and 20-3 to perform switching for belonging to other master station devices 10, and instructs other master station devices 10 to perform switching for the assignment of the slave station devices 20-2 and 20-3 to the other master station devices 10. Here, other master station devices 10 are, for example, master station devices 10 to which other slave station devices 20 are not assigned or master station devices 10 having a margin of processing resources even when the slave station devices 20 are assigned to the master station devices 10.

In FIG. 9, it is assumed that the switching control unit 402d instructs the slave station device 20-2 to perform switching for belonging to the master station device 10-2, instructs the slave station device 20-3 to perform switching for belonging to the master station device 10-3, instructs the master station device 10-2 to perform switching for making the slave station device 20-2 are assigned to the master station device 10-2, and instructs the master station device 10-2 to perform switching for making the slave station device 20-2 are assigned to the master station device 10-2.

Thereby, the master station devices 10-1 to 10-3 and the slave station devices 20-1 to 20-3 change their own setting. In this case, the master station device 10-1 cancels an assignment relationship between the slave station devices 20-2 and 20-3. In addition, the slave station device 20-2 changes the setting of the slave station device 20-2 so as to be assigned to the master station device 10-2. The master station device 10-2 changes the setting of the master station device 10-2 so as to make the slave station device 20-2 be assigned to the master station device 10-2. The slave station device 20-3 changes the setting of the slave station device 20-3 so as to be assigned to the master station device 10-3. The master station device 10-3 changes the setting of the master station device 10-3 so as to make the slave station device 20-3 be assigned to the master station device 10-3.

Thereafter, the switching control unit 402d performs switching-control of a transfer path (step S204). Specifically, the switching control unit 402d performs switching-control of a transfer path so that data is transmitted and received to and from a device after an assignment relationship is changed. For example, in the above-described example, the switching control unit 402d switches a transfer path so that data is transmitted and received between the master station device 10-2 and the slave station device 20-2 and between the master station device 10-3 and the slave station device 20-3.

The switching control unit 402d performs switching-control of a transfer path by transmitting, to the master station device 10 and the slave station device 20, an instruction for changing a destination address of a frame to be transmitted in the master station device 10 and the slave station device 20. For example, the switching control unit 402d transmits an instruction for setting a destination address of data to be an address of the slave station device 20-1 to the master station device 10-1. In addition, the switching control unit 402d transmits an instruction for setting a destination address of data to be an address of the master station device 10-2 to the slave station device 20-2 and transmits an instruction for setting a destination address of data to be an address of the slave station device 20-2 to the master station device 10-2.

Further, the switching control unit 402d transmits an instruction for setting a destination address of data to be an address of the master station device 10-3 to the slave station device 20-3 and transmits an instruction for setting a destination address of data to be an address of the slave station device 20-3 to the master station device 10-3. Thereby, the slave station device 20-2 sets a destination address of data to be the master station device 10-2. The slave station device 20-3 sets a destination address of data to be the master station device 10-3. The master station device 10-2 sets a destination address of data to be the slave station device 20-2. The master station device 10-3 sets a destination address of data to be the slave station device 20-3.

Figure 10:
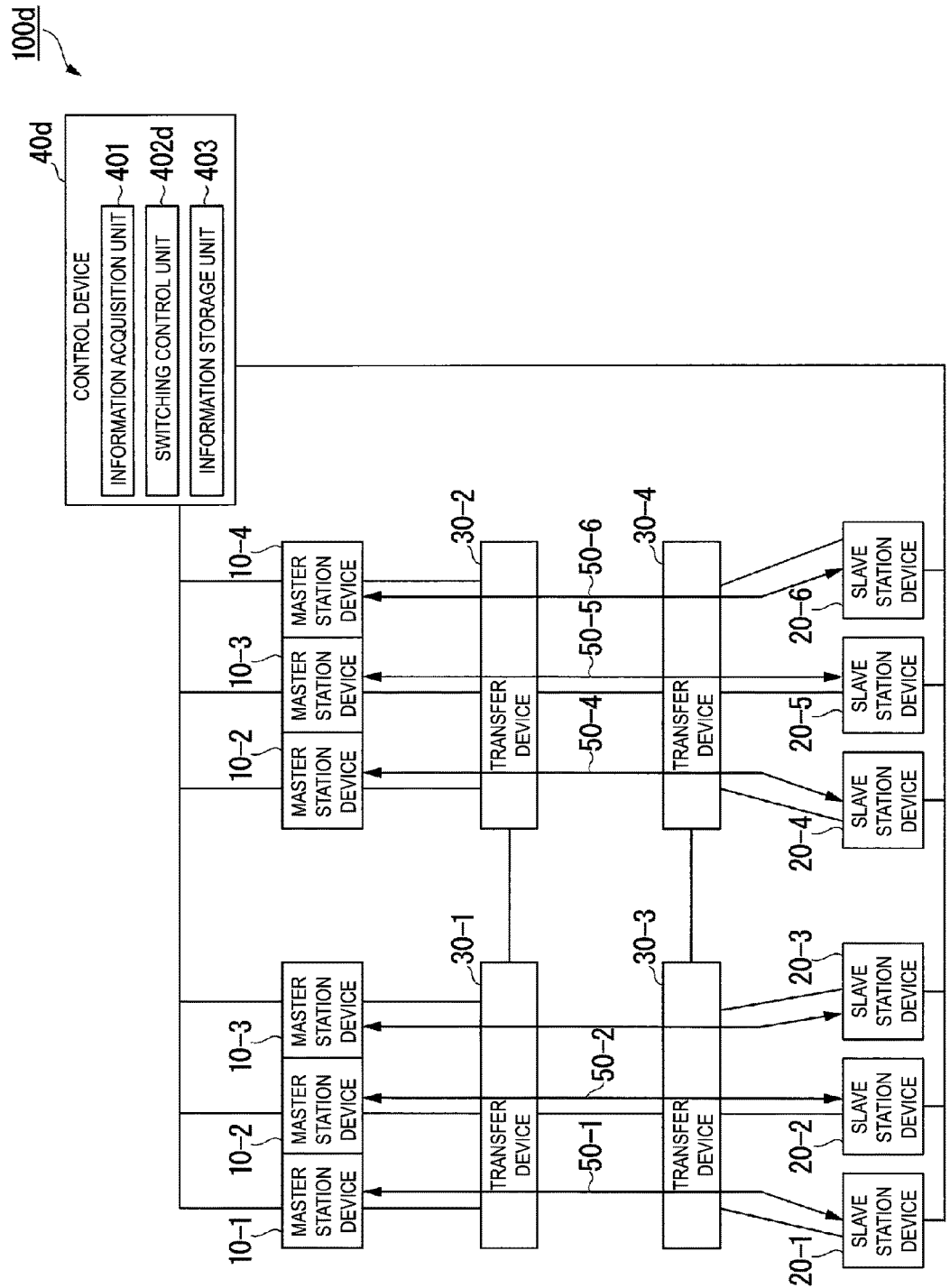
FIG. 10 is a diagram illustrating a configuration of the communication system after switching control according to the fifth embodiment.
Figure 11:
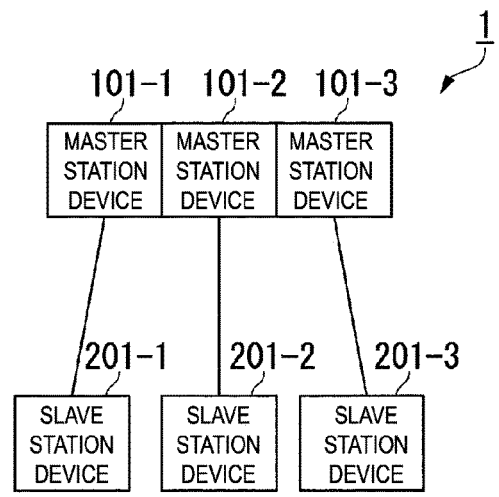
FIG. 11 is a diagram illustrating a configuration of a communication system of C-RAN in the related art.
Figure 12:
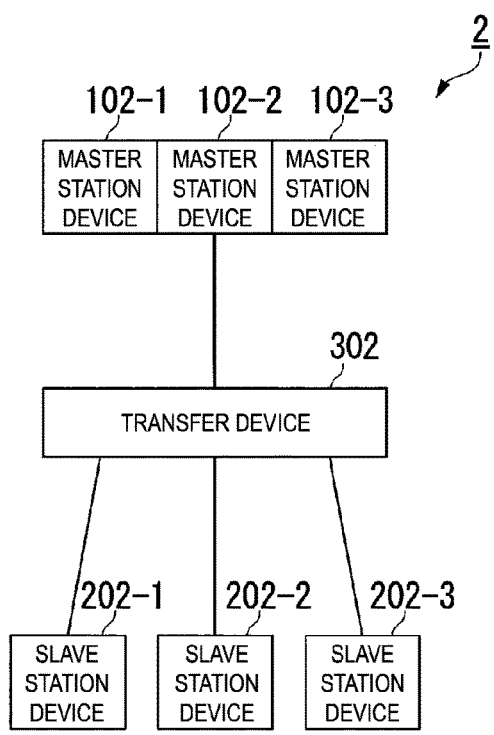
FIG. 12 is a diagram illustrating a configuration of a communication system in which a transfer device is installed.
Figure 13:
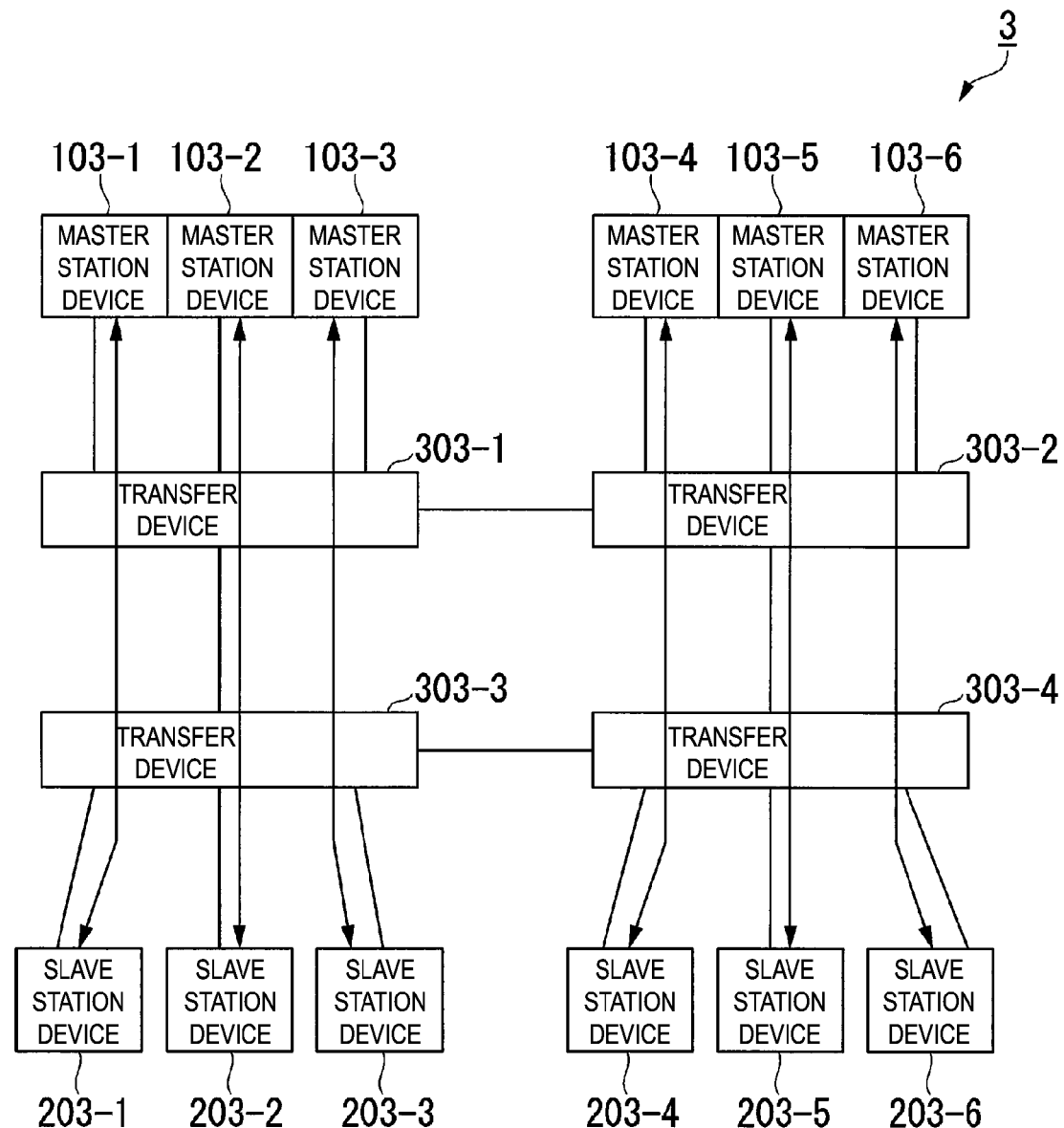
FIG. 13 is a diagram illustrating a configuration of a communication system in which a plurality of transfer devices are installed.

FIG. 10 is a diagram illustrating a configuration of the communication system 100 after switching control according to the fifth embodiment.

As illustrated in FIG. 10, after switching control is performed, a transfer path is switched such that data is transmitted and received between the master station device 10-1 and the slave station device 20-1, between the master station device 10-2 and the slave station device 20-2, and between the master station device 10-3 and the slave station device 20-3, and control is performed such that data of the slave station device 20-2 and the slave station device 20-3 is not transmitted and received to and from the master station device 10-1. Thereby, traffic that cannot be processed by only the master station device 10-1 can be processed, and processing resources of the master station devices 10-1 to 10-3 can be effectively utilized.

In a case where traffic of a plurality of slave station devices 20 cannot be processed by only a certain specific master station device 10 under a situation where the plurality of slave station devices 20 are assigned to the specific master station device 10, the control device 40 configured as described above disperses traffic by causing the slave station devices 20 to be assigned to other master station devices 10. Thereby, all traffic can be processed, and processing resources of the master station devices 10 can be effectively utilized.

Modification Example

An object to be monitored by the information acquisition unit 401 may be a QoS value of traffic rather than the amount of traffic.

In the process of step S202, the switching control unit 402*d* may be configured to execute the process of step S203 and the subsequent processes in a case where traffic to be processed by one master station device 10 exceeds a predetermined percentage (for example, 80%) of processing resources of one master station device 10. With such a configuration, traffic can be dispersed before traffic to be processed by one master station device 10 exceeds processing resources of one master station device 10. Thus, it is possible to prevent traffic from being unable to be processed due to excess of processing resources of one master station device 10.

In the present embodiment, as in the first embodiment, a case where the control device 40*d* is connected to the master station devices 10-1 to 10-6 and the slave station devices 20-1 to 20-6 has been described, but the control device 40*d* may be connected to all of the master station devices 10-1 to 10-6, the slave station devices 20-1 to 20-6, and the transfer devices 30-1 to 30-4 to give an instruction for performing switching-control of a transfer path of data to the transfer device 30 as in the second embodiment. In addition, switching-control of an assignment relationship and switching-control of a transfer path of data may be performed using a method of any one of the first to fourth embodiments.

In the above-described embodiments, the numbers of the master station devices 10 and 10*a* and the numbers of the slave station devices 20 and 20*a* are not necessarily limited to the above-described numbers as long as the numbers are two or more. In addition, the numbers of the transfer devices 30 and 30*a* are not necessarily limited to the above-described numbers as long as the numbers are one or more.

The embodiments of the present disclosure have been described above in detail with reference to the drawings. However, specific configurations are not limited to those embodiments, and include any design or the like within the scope not departing from the gist of the present disclosure.

REFERENCE SIGNS LIST

10, 10-1 to 10-6, 10*a*, 10*a*-1 to 10*a*-6 Master station device (Master station apparatus)
20, 20-1 to 20-6, 20*a*, 20*a*-1 to 20*a*-6 Slave station device (Slave station apparatus)
30, 30-1 to 30-4, 30*a*, 30*a*-1 to 30*a*-4 Transfer device (Transfer apparatus)
40, 40*a*, 40*b*, 40*c*, 40*d* Control device (Control apparatus)
401, 401*a*, 401*b*, 401*b*-1 to 401*b*-8, 401*c* Information acquisition unit
402, 402*a*, 402*b*, 402*b*-1 to 402*b*-8, 402*c*, 402*d* Switching control unit
403, 403*b*, 403*b*-1 to 403*b*-8, 403*c* Information storage unit
404, 404*b*, 404*b*-1 to 404*b*-8, 404*c* Information sharing unit

The invention claimed is:

1. A control apparatus that controls any one or all of a plurality of slave station apparatuses, a plurality of master station apparatuses, and a transfer apparatus, a slave station apparatus of the plurality of slave station apparatuses being assigned to a master station apparatus of the plurality of master station apparatuses, the master station apparatus controlling the slave station apparatus, and the transfer apparatus transferring data transmitted and received between the master station apparatus and the slave station apparatus, the control apparatus comprising:
    an information acquisitioner configured to acquire information regarding traffic of the data transmitted and received between the master station apparatus and the slave station apparatus; and
    a switching controller configured to perform, on the basis of the information regarding the traffic acquired by the information acquisitioner,
        switching-control of an assignment relationship between the master station apparatus and the slave station apparatus, and
        switching-control of a transfer path of data between the master station apparatus and the slave station apparatus,
    the control apparatus further comprising:
        an information sharing unit configured to share, with another control apparatus, information regarding any one or all of the master station apparatus, the slave station apparatus, and the transfer apparatus that are not connected to the control apparatus,
        wherein the switching controller performs the switching-control of the assignment relationship and the switching-control of the transfer path of data on any one apparatus of the master station apparatus, the slave station apparatus, and the transfer apparatus that are connected to the control apparatus, using the information shared with the other control apparatus by the information sharing unit.

2. The control apparatus according to claim 1, wherein, in a case where traffic of another slave station apparatus of the plurality of slave station apparatuses that is assigned to another master station apparatus of the plurality of master station apparatuses is able to be processed in one master station apparatus of the plurality of master station apparatuses, the switching controller performs switching-control of an assignment relationship to assign the other slave station apparatus assigned to the other master station apparatus to the one master station apparatus, and performs switching-control of a transfer path of data by instructing the other slave station apparatus to set destinations of data transmitted from the other slave station apparatuses assigned to the other master station apparatus to be a destination of the one master station apparatus.

3. The control apparatus according to claim 1, wherein, in a case where traffic of another slave station apparatus of the plurality of slave station apparatuses that is assigned to another master station apparatus of the plurality of master station apparatuses is able to be processed in one master station apparatus of the plurality of master station apparatuses, the switching controller performs switching-control of an assignment relationship to assign the other slave station apparatus assigned to the other master station apparatus to the one master station apparatus, and performs switching-control of a transfer path of data by instructing the transfer apparatus to set destinations of data transmitted from the other slave station apparatuses assigned to the other master station apparatus to be a destination of the one master station apparatus.

4. The control apparatus according to claim 1, wherein, in a case where traffic of a plurality of slave station apparatuses assigned to one master station apparatus of the plurality of master station apparatuses is equal to or greater than a predetermined percentage of processing resources of the one master station apparatus, the switching controller performs switching-control of an assignment relationship to assign a slave station apparatus which is a target for switching, among the plurality of slave station apparatuses assigned to the one master station apparatus, to another master station apparatus of the plurality of master station apparatuses, and performs switching-control of a transfer path of data by instructing the slave station apparatus which is a target for switching, among the plurality of slave station apparatuses assigned to the one master station apparatus, to set a destination of data transmitted from the slave station apparatus which is a target for switching to be a destination of the other master station apparatus.

5. The control apparatus according to claim 1, wherein, in a case where traffic of a plurality of slave station apparatuses assigned to one master station apparatus of the plurality of master station apparatuses is equal to or greater than a predetermined percentage of processing resources of the one master station apparatus, the switching controller performs switching-control of an assignment relationship to assign a slave station apparatus which is a target for switching, among the plurality of slave station apparatuses assigned to the one master station apparatus, to another master station apparatus of the plurality of master station apparatuses, and performs switching-control of a transfer path of data by instructing the transfer apparatus to set a destination of data transmitted from the slave station apparatus which is a target for switching, among the plurality of slave station apparatuses assigned to the one master station apparatus, to be a destination of the other master station apparatus.

6. A control method performed by a control apparatus that controls any one or all of a plurality of slave station apparatuses, a plurality of master station apparatuses, and a transfer apparatus, a slave station apparatus of the plurality of slave station apparatuses being assigned to a master station apparatus of the plurality of master station apparatuses, the master station apparatus controlling the slave station apparatus, the transfer apparatus transferring data transmitted and received between the master station apparatus and the slave station apparatus, the control method comprising:

acquiring information regarding traffic of the data transmitted and received between the master station apparatus and the slave station apparatus;

performing, on the basis of the information regarding the traffic acquired in the acquiring of the information, switching-control of an assignment relationship between the master station apparatus and the slave station apparatus and switching-control of a transfer path of data between the master station apparatus and the slave station apparatus;

sharing, with another control apparatus, information regarding any one or all of the master station apparatus, the slave station apparatus, and the transfer apparatus that are not connected to the control apparatus; and performing the switching-control of the assignment relationship and the switching-control of the transfer path of data on any one apparatus of the master station apparatus, the slave station apparatus, and the transfer apparatus that are connected to the control apparatus, using the information shared with the other control apparatus.

* * * * *